(12) United States Patent
Song et al.

(10) Patent No.: US 12,401,920 B2
(45) Date of Patent: Aug. 26, 2025

(54) IMAGE SENSING DEVICE AND METHOD FOR OPERATING THE SAME

(71) Applicant: SK hynix Inc., Gyeonggi-do (KR)

(72) Inventors: Jeong Eun Song, Gyeonggi-do (KR); Yu Jin Park, Gyeonggi-do (KR); Sung Uk Seo, Gyeonggi-do (KR); Min Seok Shin, Gyeonggi-do (KR); Hoo Chan Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 193 days.

(21) Appl. No.: 17/369,459

(22) Filed: Jul. 7, 2021

(65) Prior Publication Data
US 2022/0232185 A1   Jul. 21, 2022

(30) Foreign Application Priority Data

Jan. 20, 2021  (KR) ........................ 10-2021-0007819

(51) Int. Cl.
*H04N 25/705*   (2023.01)
*H04N 13/204*   (2018.01)
(Continued)

(52) U.S. Cl.
CPC ......... *H04N 25/616* (2023.01); *H04N 25/581* (2023.01); *H04N 25/60* (2023.01); *H04N 25/70* (2023.01); *H04N 25/705* (2023.01); *H04N 25/76* (2023.01); *H04N 25/767* (2023.01); *H04N 25/77* (2023.01); *H04N 25/771* (2023.01);
(Continued)

(58) Field of Classification Search
CPC .... H04N 25/713; H04N 25/74; H04N 25/779; H04N 25/75; H04N 25/78; H04N 25/76; H04N 25/705; H04N 25/441; H04N 13/204; H04N 13/207; H04N 13/218; H04N 25/581
See application file for complete search history.

(56) References Cited

U.S. PATENT DOCUMENTS 8,810,676 B2 *   8/2014   Lim ...................... H04N 25/75
                                                         348/222.1
9,204,143 B2 *  12/2015   Wang ..................... H04N 17/04
(Continued)

FOREIGN PATENT DOCUMENTS

CN   102891969 A   1/2013
CN   110944128 A   3/2020
(Continued)

OTHER PUBLICATIONS

Machine translation of WO-2022002174-A1 (Year: 2022).*
(Continued)

*Primary Examiner* — David N Werner
(74) *Attorney, Agent, or Firm* — IP & T GROUP LLP (57) ABSTRACT

An image sensing device includes a pixel array including a unit pixel suitable to transfer and store charges in response to a transfer signal and read out a pixel signal corresponding to the stored charges in response to a selection signal provided to the unit pixel; a signal converter suitable for comparing the pixel signal with a ramp signal based on a switch signal to generate a distance information signal; and a signal controller suitable for generating the switch signal for initializing the signal converter in a temporal section where the pixel signal is read out.

16 Claims, 4 Drawing Sheets

(51) Int. Cl.
*H04N 13/207* (2018.01)
*H04N 13/218* (2018.01)
*H04N 25/581* (2023.01)
*H04N 25/60* (2023.01)
*H04N 25/616* (2023.01)
*H04N 25/70* (2023.01)
*H04N 25/71* (2023.01)
*H04N 25/75* (2023.01)
*H04N 25/76* (2023.01)
*H04N 25/767* (2023.01)
*H04N 25/77* (2023.01)
*H04N 25/771* (2023.01)
*H04N 25/78* (2023.01)
*G01S 17/894* (2020.01)
*H04N 25/67* (2023.01)

(52) U.S. Cl.
CPC ......... *H04N 25/7795* (2023.01); *H04N 25/78* (2023.01); *G01S 17/894* (2020.01); *H04N 13/204* (2018.05); *H04N 13/207* (2018.05); *H04N 13/218* (2018.05); *H04N 25/67* (2023.01)

(56) References Cited

U.S. PATENT DOCUMENTS

| | | | | |
|---|---|---|---|---|
| 10,841,504 B1* | 11/2020 | Talbert | | H04N 25/133 |
| 2003/0214597 A1* | 11/2003 | Nam | | H04N 25/633 |
| | | | | 348/308 |
| 2005/0168251 A1* | 8/2005 | Lim | | H04N 25/616 |
| | | | | 327/131 |
| 2005/0168601 A1* | 8/2005 | Lim | | H04N 25/78 |
| | | | | 348/241 |
| 2006/0012696 A1* | 1/2006 | Zarnowski | | H04N 25/00 |
| | | | | 348/294 |
| 2006/0262205 A1* | 11/2006 | Lim | | H04N 25/445 |
| | | | | 348/E5.079 |
| 2007/0046802 A1* | 3/2007 | Ham | | H04N 25/78 |
| | | | | 348/308 |
| 2007/0183006 A1* | 8/2007 | Lee | | H04N 25/616 |
| | | | | 358/482 |
| 2008/0043128 A1* | 2/2008 | Poonnen | | H04N 25/00 |
| | | | | 348/294 |
| 2008/0180555 A1* | 7/2008 | Sato | | H04N 25/441 |
| | | | | 348/E3.019 |
| 2009/0160984 A1* | 6/2009 | Lee | | H03M 1/1023 |
| | | | | 348/294 |
| 2009/0225211 A1* | 9/2009 | Oike | | H03M 1/1023 |
| | | | | 348/308 |
| 2009/0231479 A1* | 9/2009 | Zarnowski | | H04N 25/677 |
| | | | | 348/E5.091 |
| 2009/0256735 A1* | 10/2009 | Bogaerts | | H04N 25/616 |
| | | | | 341/169 |
| 2010/0020209 A1* | 1/2010 | Kim | | H04N 25/00 |
| | | | | 348/E5.022 |
| 2011/0205100 A1* | 8/2011 | Bogaerts | | H04N 25/767 |
| | | | | 341/169 |
| 2011/0242381 A1* | 10/2011 | Sakakibara | | H04N 25/65 |
| | | | | 348/301 |
| 2011/0249162 A1* | 10/2011 | Moore | | H04N 25/75 |
| | | | | 348/308 |
| 2011/0292261 A1* | 12/2011 | Hwang | | H04N 25/78 |
| | | | | 348/294 |
| 2012/0008030 A1* | 1/2012 | Kono | | H04N 5/32 |
| | | | | 348/301 |
| 2012/0019698 A1* | 1/2012 | Ui | | H04N 25/441 |
| | | | | 348/308 |
| 2012/0049042 A1* | 3/2012 | Lim | | H04N 25/767 |
| | | | | 257/E27.134 |
| 2012/0098990 A1* | 4/2012 | Jung | | H04N 25/616 |
| | | | | 248/222.1 |
| 2012/0120290 A1* | 5/2012 | Kim | | H04N 25/78 |
| | | | | 248/294 |
| 2013/0020463 A1* | 1/2013 | Lee | | H04N 25/75 |
| | | | | 250/206 |
| 2013/0270420 A1* | 10/2013 | Park | | H04N 25/78 |
| | | | | 250/208.1 |
| 2013/0306841 A1* | 11/2013 | Tate | | H04N 25/766 |
| | | | | 250/208.1 |
| 2014/0239153 A1* | 8/2014 | Gelfand | | H04N 25/616 |
| | | | | 250/208.1 |
| 2014/0263953 A1 | 9/2014 | Wang et al. | | |
| 2014/0263961 A1* | 9/2014 | Wang | | H04N 25/00 |
| | | | | 250/208.1 |
| 2014/0266309 A1* | 9/2014 | Jakobson | | H03K 5/2481 |
| | | | | 327/63 |
| 2015/0036033 A1* | 2/2015 | Tatsuzawa | | H04N 25/447 |
| | | | | 348/302 |
| 2015/0189209 A1* | 7/2015 | Yang | | H04N 25/78 |
| | | | | 348/300 |
| 2015/0237274 A1* | 8/2015 | Yang | | H04N 25/78 |
| | | | | 348/308 |
| 2015/0237315 A1* | 8/2015 | Totsuka | | H04N 25/616 |
| | | | | 348/294 |
| 2015/0281613 A1* | 10/2015 | Vogelsang | | H04N 25/772 |
| | | | | 348/300 |
| 2016/0150171 A1* | 5/2016 | Raynor | | H04N 25/445 |
| | | | | 348/302 |
| 2016/0307326 A1* | 10/2016 | Wang | | G03B 15/02 |
| 2016/0360129 A1* | 12/2016 | Yoshida | | H04N 25/616 |
| 2017/0142359 A1* | 5/2017 | Ikedo | | H04N 25/63 |
| 2017/0171487 A1* | 6/2017 | Wakabayashi | | H04N 25/00 |
| 2017/0201693 A1* | 7/2017 | Sugizaki | | H04N 25/135 |
| 2018/0152653 A1* | 5/2018 | Keel | | H04N 25/77 |
| 2018/0191971 A1* | 7/2018 | Kim | | H04N 25/78 |
| 2018/0213205 A1* | 7/2018 | Oh | | H01L 27/14627 |
| 2019/0115931 A1* | 4/2019 | Hurwitz | | H04N 25/78 |
| 2019/0124284 A1* | 4/2019 | Kim | | H04N 25/78 |
| 2019/0124285 A1* | 4/2019 | Otaka | | H04N 25/79 |
| 2019/0174084 A1* | 6/2019 | Kuo | | H04N 25/772 |
| 2019/0175085 A1* | 6/2019 | Bullington | | A61B 5/150221 |
| 2020/0003874 A1* | 1/2020 | Moriyama | | G01S 7/4863 |
| 2020/0236309 A1* | 7/2020 | Kim | | H04N 25/40 |
| 2021/0235035 A1* | 7/2021 | Shvartz | | G01S 17/894 |
| 2021/0306586 A1* | 9/2021 | Yamamoto | | H04N 25/44 |
| 2021/0337146 A1* | 10/2021 | Sakakibara | | H04N 25/616 |
| 2022/0116565 A1* | 4/2022 | Tsai | | H04N 25/59 |
| 2022/0123033 A1* | 4/2022 | Park | | H01L 27/14605 |

FOREIGN PATENT DOCUMENTS

| | | | | |
|---|---|---|---|---|
| CN | 112040159 A | | 12/2020 | |
| EP | 1956715 A1 * | | 8/2008 | ............... H03M 1/08 |
| EP | 3439182 A1 * | | 2/2019 | .......... H03M 1/0685 |
| WO | WO-2020026626 A1 * | | 2/2020 | ........... H04N 13/207 |
| WO | WO-2020045373 A1 * | | 3/2020 | ............ H04N 5/3658 |
| WO | WO-2020056059 A1 * | | 3/2020 | ......... G01D 5/35312 |
| WO | WO-2022002174 A1 * | | 1/2022 | |

OTHER PUBLICATIONS

SIPO, Machine translation of First Office Action for Application CN202111651066.3 (Jul. 8, 2024) (Year: 2024).*

Office Action for Chinese Patent Application No. 202111651066.3 issued by the Chinese Patent Office on Jul. 8, 2024.

* cited by examiner

IMAGE SENSING DEVICE AND METHOD FOR OPERATING THE SAME

CROSS-REFERENCE TO RELATED APPLICATIONS

The present application claims priority of Korean Patent Application No. 10-2021-0007819, filed on Jan. 20, 2021, which is incorporated herein by reference in its entirety.

BACKGROUND

1. Field

Exemplary embodiments of the present invention relate to semiconductor designing technology, and more particularly, to an image sensing device and a method for operating the image sensing device.

2. Description of the Related Art

An image sensing device is a device that captures an image by using the property of a semiconductor that responds to light. Image sensing devices are generally divided into an image sensing device adopting a charge coupled device (CCD) and an image sensing device adopting a Complementary Metal Oxide Semiconductor (CMOS) device. Recently, Image sensing devices using CMOS devices are widely used due to its advantage that analog and digital control circuits can be directly realized over an integrated circuit (IC).

SUMMARY

Embodiments of the present invention are directed to an image sensing device capable of reducing noise by setting an offset voltage for analog-to-digital (A/D) conversion based on a read-out pixel signal, and a method for operating the image sensing device.

In accordance with an embodiment of the present invention, an image sensing device may include a pixel array including a unit pixel suitable to transfer and store charges in response to a transfer signal and read out a pixel signal corresponding to the stored charges in response to a selection signal provided to the unit pixel; a signal converter suitable for comparing the pixel signal with a ramp signal based on a switch signal to generate a distance information signal; and a signal controller suitable for generating the switch signal for initializing the signal converter in a temporal section where the pixel signal is read out.

In accordance with another embodiment of the present invention, a method for operating an image sensing device may include reading out, in response to a selection signal, a first pixel signal and a second pixel signal respectively corresponding to a first charges and a second charges that are stored in a unit pixel; setting an offset voltage between the read-out first and second pixel signals and a ramp signal in response to a switch signal; resetting the first and second pixel signals in response to a transfer signal; and generating a distance information signal corresponding to a voltage change difference between the reset first pixel signal and the reset second pixel signal in response to the ramp signal.

In accordance with another embodiment of the present invention, a method for operating an image sensing device having a pixel array including a unit pixel comprising a first pixel and a second pixel, the method may include storing a first charges in the first pixel based on a first photodiode output, the first charges a) based on a reflected signal returning to the image sensing device from a subject and b) produced in response to a first phase signal that is in phase with an optical signal output from the image sensing device; storing a second charges in the second pixel based on a second photodiode output, the second charges a) based on the reflected signal and b) produced in response to a second phase signal that has a phase difference with the optical signal output from the image sensing device; reading out a first pixel signal from the first pixel corresponding to the first charges; reading out a second pixel signal from the second pixel corresponding to the second charges; and comparing the first pixel signal and the second pixel signal to a ramped reference signal to generate a distance information signal corresponding to a voltage change difference.

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It will be understood that when an dement is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

Figure 1:
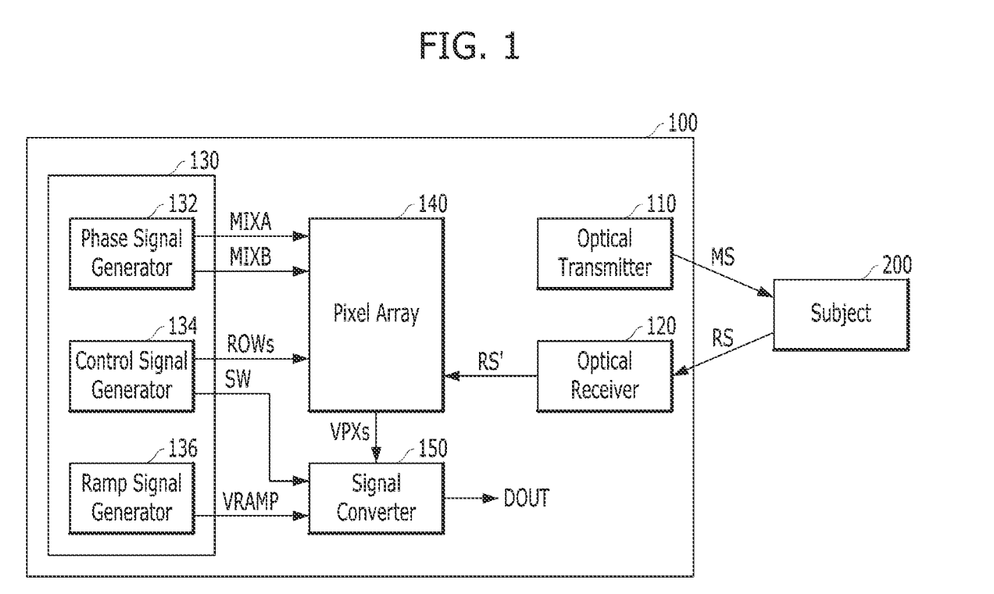
FIG. 1 is a block diagram illustrating an image sensing device in accordance with an embodiment of the present invention.

FIG. 1 is a block diagram illustrating an image sensing device 100 in accordance with an embodiment of the present invention.

Referring to FIG. 1, the image sensing apparatus 100 may generate a distance information signal DOUT indicating a depth from a subject 200 by using a time of flight (TOF) method. For example, the image sensing device 100 may detect a phase difference between a first optical signal MS output to the subject 200 and a second optical signal RS reflected from the subject 200 to generate the distance information signal DOUT. The image sensing apparatus 100 may include an optical transmitter 110, an optical receiver 120, a signal controller 130, a pixel array 140, and a signal converter 150.

The optical transmitter 110 may output the first optical signal MS to the subject 200. Herein, the first optical signal MS may be a periodic signal that periodically toggles.

The optical receiver 120 may receive the second optical signal RS that is reflected from the subject 200. The optical receiver 120 may remove noise originating from ambient light from the second optical signal RS and provide the pixel array 140 with a third optical signal RS' corresponding to the first optical signal MS.

The signal controller 130 may generate control signals MIXA, MIXB, ROWs, SW, and VRAMP for controlling the pixel array 140 and the signal converter 150. Referring to FIG. 1, the signal controller 130 may include a phase signal generator 132, a control signal generator 134, and a ramp signal generator 136.

The phase signal generator 132 may generate a first phase signal MIXA and a second phase signal MIXB having different phases. For example, the first and second phase signals MIXA and MIXB may have a phase difference for example of approximately 180 degrees, but other phase differences may be used. The first and second phase signals MIXA and MIXB may have the same period as the first optical signal MS, and one of the first phase signal MIXA and the second phase signal MIXB may have the same phase as that of the first optical signal MS with the other one having a phase difference of approximately 180 degrees (see FIG. 4).

The control signal generator 134 may generate a plurality of row signals ROWs for controlling the pixel array 140 on a row basis. For example, the control signal generator 134 may generate first row signals for controlling the pixels that are arranged in a first row of the pixel array 140 and generate $n^{th}$ row signals for controlling the pixels that are arranged in an $n^{th}$ row of the pixel array 140 (where 'n' is a natural number greater than 2). Also, the control signal generator 134 may generate a switch signal SW for initializing the signal converter 150.

The ramp signal generator 136 may generate a ramp signal VRAMP and transfer the ramp signal VRAMP to the signal converter 150, The ramp signal VRAMP may include a signal having a voltage level which rises at a predetermined slope between a low voltage level and a high voltage level.

The pixel array 140 may generate a plurality of pixel signals VPXs based on the third optical signal RS', the first and second phase signals MIXA and MIXB, and the row signals ROWs. The pixel array 140 may include at least one unit pixel 142 (shown for example in FIG. 2) for measuring a distance to the subject 200. In one embodiment, the unit pixel 142 may be selected based on the row signals ROWs, and the unit pixel 142 may generate pixel signals VPXs such as the first pixel signal VPX_A and the second pixel signal VPX_B based on the first and second phase signals MIXA and MIXB (one having the same phase as the first optical signal MS and the other having a predetermined phase difference such 180 degrees from the first optical signal MS) and the third optical signal RS' (having a different phase from the first optical signal MS). The structure of the unit pixel 142 will be described in more detail with reference to FIG. 2.

Figure 2:
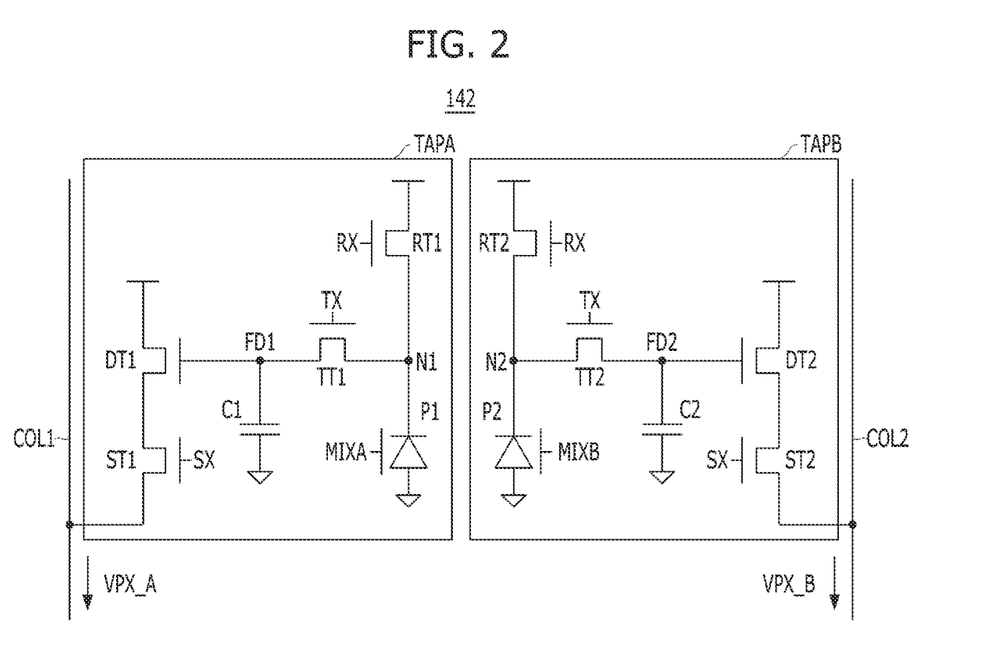
FIG. 2 is a circuit diagram illustrating a unit pixel included in a pixel array shown in FIG. 1.

The signal converter 150 may generate a distance information signal DOUT indicating a distance to the subject 200 based on the pixel signals VPXs. For example, the signal converter 150 may perform an analog-to-digital (A/D) conversion to the first pixel signal VPX_A and the second pixel signal VPX_B so as to produce digital signals and generate the distance information signal DOUT by processing the obtained digital signals, FIG. 2 is a circuit diagram illustrating unit pixel 142 included in the pixel array 140 shown in FIG. 1, Referring to FIG. 2, unit pixel 142 may include a first pixel TAPA and a second pixel TAPB.

The first pixel TAPA may generate the first pixel signal VPX_A based on a reset signal RX, a transfer signal TX, a selection signal SX, and the first phase signal MIXA, The reset signal RX, the transfer signal TX, and the selection signal SX may be signals included in the row signals ROWs described earlier. Referring to FIG. 2, a first pixel TAPA may include a first sensing circuit P1, a first reset circuit RT1, a first transfer circuit TT1, a first charge storage circuit C1, and a first driving circuit DT1, and a first selection circuit ST1.

The first sensing circuit P1 may be coupled between a first node N1 and a low voltage terminal. The first sensing circuit P1 may generate first charges corresponding to the third optical signal RS' in response to the first phase signal MIXA. In one embodiment, the first sensing circuit P1 may include a photodiode which receives the third optical signal RS' and converts the third optical signal RS' into a first digital signal related to the first charges and provides (in response to the first phase signal MIXA) the first digital signal to the first node N1.

The first reset circuit RT1 may be coupled between a high voltage terminal and the first node N1. The first reset circuit RT1 may reset the first sensing circuit P1 and the first charge storage circuit C1 in response to the reset signal RX. In one embodiment, the first reset circuit RT1 may include an NMOS transistor.

The first transfer circuit TT1 may be coupled between the first node N1 and a first floating diffusion node FD1, The first transfer circuit TT1 may reset the first charge storage circuit C1 in response to the transfer signal TX and transfer the first charges generated from the first sensing circuit P1 to the first charge storage circuit C1. According to one embodiment of the present invention, in a read-out section of the first pixel TAPA, the first transfer circuit TT1 may reset the first charge storage circuit C1 in response to the transfer signal TX. In one embodiment, the first transfer circuit TT1 may include an NMOS transistor.

The first charge storage circuit C1 may be coupled between the first floating diffusion node FD1 and a low voltage terminal. As described above, in a read-out section of the first pixel TAPA, the first charge storage circuit C1 may be reset by the first transfer circuit TT1. In one embodiment, the first charge storage circuit C1 may include a parasitic capacitor and/or a capacitor added between the first floating diffusion node FD1 and the low voltage terminal.

The first driving circuit DT1 may be coupled between a high voltage terminal and the first selection circuit ST1. The first driving circuit DT1 may drive a first column line COL1 with a high voltage that is supplied through the high voltage terminal based on the voltage applied to the first floating diffusion node FD1. In one embodiment, the first driving circuit DT1 may include an NMOS transistor.

The first selection circuit ST1 may be coupled between the first driving circuit DT1 and the first column line COL1. The first selection circuit ST1 may selectively couple the first driving circuit DT1 to the first column line COL1 in response to the selection signal SX. In one embodiment, the first selection circuit ST1 may include an NMOS transistor.

The second pixel TAPB may generate the second pixel signal VPX_B based on the reset signal RX, the transfer signal TX, the selection signal SX, and the second phase signal MIXB, Referring to FIG. 2, the second pixel TAPB may include a second sensing circuit P2, a second reset circuit RT2, a second transfer circuit TT2, a second charge storage circuit C2, and a second driving circuit DT2, and a second selection circuit ST2.

The second sensing circuit P2 may be coupled between the second node N2 and a low voltage terminal that can be but is not necessarily the low voltage terminal of TAPA. The second sensing circuit P2 may generate second charges corresponding to the third optical signal RS' in response to the second phase signal MIXB. In one embodiment, the second sensing circuit P2 may include a photodiode which receives the third optical signal RS' and converts the third optical signal RS' into a second digital signal related to the second charges and provides (in response to the second phase signal MIXB) the second digital signal to the second node N2.

The second reset circuit RT2 may be coupled between a high voltage terminal (that can be but is not necessarily the high voltage terminal of TAPA) and the second node N2. The second reset circuit RT2 may reset the second sensing circuit P2 and the second charge storage circuit C2 in response to the reset signal RX. In one embodiment, the second reset circuit RT2 may include an NMOS transistor.

The second transfer circuit TT2 may be coupled between the second node N2 and the second floating diffusion node FD2. The second transfer circuit TT2 may reset the second charge storage circuit C2 in response to the transfer signal TX and transfer the second charges generated from the second sensing circuit P2 to the second charge storage circuit C2. According to one embodiment of the present invention, in a read-out section of the second pixel TAPB, the second transfer circuit TT1 may reset the second charge storage circuit C2 in response to the transfer signal TX, In one embodiment, the second transfer circuit TT2 may include an NMOS transistor.

The second charge storage circuit C2 may be coupled between the second floating diffusion node FD2 and the low voltage terminal. As described above, in a read-out section of the second pixel TAPB, the second charge storage circuit C2 may be reset by the second transfer circuit TT2. In one embodiment, the second charge storage circuit C2 may include a parasitic capacitor and/or a capacitor added between the second floating diffusion node FD2 and the low voltage terminal.

The second driving circuit DT2 may be coupled between the high voltage terminal and the second selection circuit ST2. The second driving circuit DT2 may drive the second column line COL2 with a high voltage that is supplied through the high voltage terminal based on the voltage that is applied to the second floating diffusion node FD2. In one embodiment, the second driving circuit DT2 may include an NMOS transistor.

The second selection circuit ST2 may be coupled between the second driving circuit DT2 and the second column line COL2, The second selection circuit ST2 may selectively couple the first driving circuit DT2 to the second column line COL2 in response to the selection signal SX. In one embodiment, the second selection circuit ST2 may include an NMOS transistor.

Figure 3:
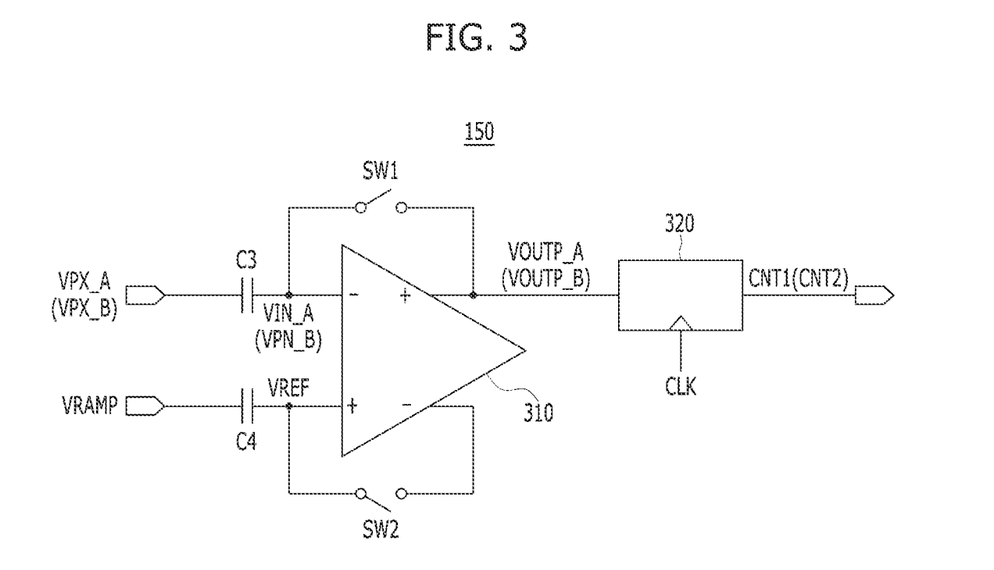
FIG. 3 is a block diagram illustrating a signal converter shown in FIG. 1.

FIG. 3 is a block diagram illustrating an example of the signal converter 150 shown in FIG. 1.

The signal converter 150 may generate a first count signal CNT1 and a second count signal CNT2 corresponding to the voltage level difference between the first pixel signal VPX_A and the second pixel signal VPX_B and the ramp signal VRAMP. Since the signal converter 150 may have the same structure to process the first pixel signal VPX_A and the second pixel signal VPX_B, FIG. 3 shows only the structure that processes one of the first pixel signal VPX_A and the second pixel signal VPX_B.

Referring to FIG. 3, the signal converter 150 may include first and second input units (first and second input circuits) C3 and C4 (e.g., a capacitive circuit which may include capacitors), first and second switching units (first and second switching circuits) SW1 and SW2 (e.g., switching circuits which may include transistor-controlled switches), a comparison unit 310 (e.g., a comparator), and a counting unit 320 (e.g., a counter). The signal converter 150 may in one embodiment include a structure that calculates the first count signal CNT1 and the second count signal CNT2 and outputs the difference between the count values CNT1 and CNT2 as a distance information signal DOUT, such as a logic operation unit (e.g., a logic circuit).

The first input unit C3 may generate an input signal VIN_A or VIN_B by receiving the first pixel signal VPX_A or the second pixel signal VPX_B. For example, the first input unit C3 may include a capacitor that samples the first pixel signal VPX_A or VPX_B to generate the input signal VIN_A or VIN_B.

The second input unit C4 may generate a reference signal VREF by receiving the ramp signal VRAMP. For example, the second input unit C4 may include a capacitor that samples the ramp signal VRAMP to generate the reference signal VREF.

The comparison unit 310 may compare the input signal VIN_A (or VIN_B) with the reference signal VREF to output a comparison signal VOUTP_A (or VOUTP_B). The comparison unit 310 may maintain the comparison signal VOUTP_A (or VOUTP_B) at a logic high level (or a logic low level) until the voltage level of the reference signal VREF becomes the same as the input signal VIN_A (or VIN_B).

The first and second switching units SW1 and SW2 may be coupled between the input node and the output node of the comparison unit 310. In response to a switch signal SW, the first and second switching units SW1 and SW2 may selectively couple the input node and the output node of the comparison unit 310. When the switch signal SW transitions between a logic low level and a logic high level, the first and second switching units SW1 and SW2 may be turned on to couple the input node to the output node of the comparison unit 310.

The counting unit 320 may count a clock signal CLK in response to the comparison signal VOUTP_A (or VOUTP_B) and output the count signal CNT1 (or CNT2). The counting unit 320 may output the count signal CNT1 (or CNT2) having a count value corresponding to a section in which the logic level of the comparison signal VOUTP_A or VOUTP_B is maintained.

Figure 4:
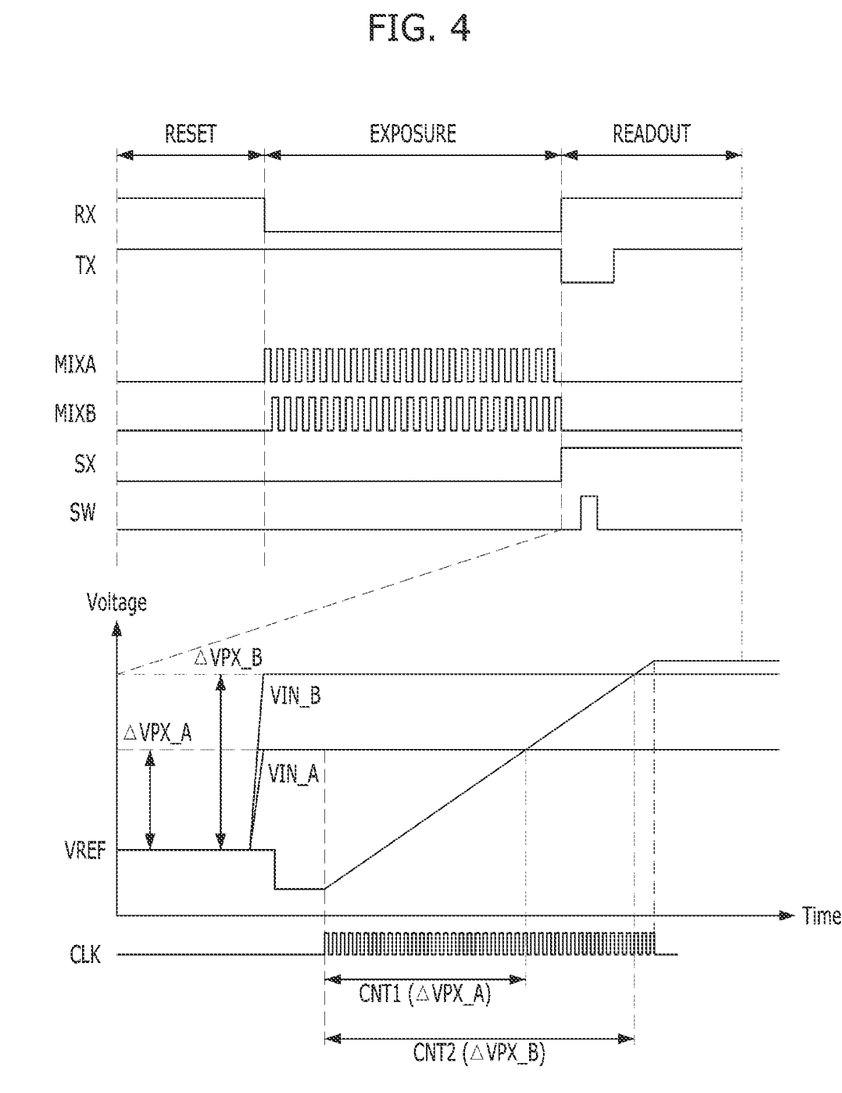
FIG. 4 is a timing diagram illustrating an operation of the image sensing device shown in FIG. 1.

FIG. 4 is a timing diagram illustrating an operation of the image sensing device 100 shown in FIG. 1.

Referring to FIG. 4, the first and second pixels TAPA and TAPB may perform a reset operation during a reset section RESET in response to a reset signal RX and a transfer signal TX. In one embodiment, when the reset signal RX is activated, the first sensing circuit P1 of the first pixel TAPA and the second sensing circuit P2 of the second pixel TAPB may be reset. Also, in response to activation of the reset signal RX and the transfer signal TX, the first charge storage circuit C1 of the first pixel TAPA and the second charge storage circuit C2 of the second pixel TAPB may be reset.

Subsequently, during an exposure section EXPOSURE, the first and second pixels TAPA and TAPB may generate, transfer, and store respectively first and second charges based on the third optical signal RS', the transfer signal TX, and the first and second phase signals MIXA and MIXB. In one embodiment, the first sensing circuit P1 may generate the first charges based on the third optical signal RS' and the first phase signal MIXA. When the first transfer circuit TT1 of the first pixel TAPA transfers the first charges in response to the transfer signal TX, the first charge storage circuit C1 may store the first charges. Likewise, the second sensing circuit P2 may generate the second charges based on the third optical signal RS' and the second phase signal MIXB. When the second transfer circuit TT2 of the second pixel TAPB transfers the second charges in response to the transfer signal TX, the second charge storage circuit C2 may store the second charges. In this case, the first phase signal MIXA and the second phase signal MIXB may have a phase difference of for example approximately 180 degrees.

During a temporal read-out section READOUT (shown in FIG. 4) of the first and second pixels TAPA and TATS, the reset signal RX and the selection signal SX may be activated to a logic high level. The first and second pixels TAPA and TATB may read out the first and second pixel signals VPX_A and VPX_B corresponding to the first and second charges stored in the first and second charge storage circuits C1 and C2 in response to the selection signal SX.

In one embodiment, in the first pixel TAPA, the first selection circuit ST1 may electrically couple the first driving circuit DT1 and the first column line COL1 in response to activation of the selection signal SX. The first driving circuit DT1 may read out the first pixel signal VPX_A by driving the first column line COL1 with a high voltage according to the voltage applied to the first floating diffusion node FD1.

Similarly in one embodiment, in the second pixel TAPB, the second selection circuit ST2 may electrically couple the second driving circuit DT2 and the second column line COL2 in response to activation of the selection signal SX. The second driving circuit DT2 may read out the second pixel signal VPX_B by driving the second column line COL2 with a high voltage according to the voltage applied to the second floating diffusion node FD2.

According to one embodiment of the present invention, the switch signal SW may transition between a logic low level and a logic high level at the beginning of the temporal read-out section READOUT. The control signal generator 134 of the signal controller 130 may activate the selection signal SX for the temporal read-out section READOUT shown in FIG. 4, and when the selection signal SX is activated, the switch signal SW may transition between a logic low level and a logic high level.

In response to the transition of the switch signal SW changing from a logic low level to a logic high level, the signal converter 150 may be initialized. In one embodiment, in response to the transition of the switch signal SW to a logic high level, the first and second switching units SW1 and SW2 may be turned on to couple the input node and the output node of the comparison unit 310. The offset voltage between the read-out first and second pixel signals VPX_A and VPX_B and the ramp signal VRAMP may be stored in the first and second input units C3 and C4. The initialization operation of the signal converter 150 may in one embodiment include an auto-zeroing operation of offsetting the input offset voltage of the comparison unit 310.

In one embodiment, after the switch signal SW transitions to a logic high level, the control signal generator 134 of the signal controller 130 may activate the transfer signal TX. When the transfer signal TX is activated while the reset signal RX is in a logic high level in a temporal read-out section READOUT (such as shown in FIG. 4), the first and second pixel signals VPX_A and VPX_B are reset. In one embodiment, the first and second reset circuits RT1 and RT2 and the first and second transfer circuits TT1 and TT2 may initialize the first and second charge storage circuits C1 and C2 in response to the activated reset signal RX and the transfer signal TX. Accordingly, as illustrated in the lower half of FIG. 4, the first and second pixel signals VPX_A and VPX_B, that is, the input signals VIN_A and VIN_B may increase by as much as the reset voltage changes (that is by as much as ΔVPX_A and ΔVPX_B).

After the transfer signal TX is activated, the ramp signal generator 136 of the signal controller 130 may generate a ramp signal VRAMP that rises (e.g., gradually rises) from a low voltage to a high voltage. The voltage level of the reference signal VREF may also increase in proportion to the ramp signal VRAMP, The comparison unit 310 in one embodiment may compare the input signals VIN_A and VIN_B with the reference signal VREF and continue to produce the comparison signals VOUTP_A and VOUTP_B at a logic high level or a logic low level until the voltage level of the reference signal VREF becomes the same as the input signals VIN_A and VIN_B.

In one embodiment, the counting unit 320 may count the dock signal CLK (shown in the lower half of FIG. 4) from a first moment when the reference signal VREF begins to ramp to respective second moments when the logic levels of the comparison signals VOUTP_A and VOUTP_B change, and generate the first and second count signals CNT1 and CNT2 that respectively correspond to the voltage changes ΔVPX_A and ΔVPX_B. The signal converter 150 may process the first and second count signals CNT1 and CNT2 (corresponding to the voltage changes ΔVPX_A and ΔVPX_B) to output a distance information signal DOUT corresponding to the difference between the first charges and the second charges generated in the first pixels TAPA and the second pixels TAPS.

Figure 5:
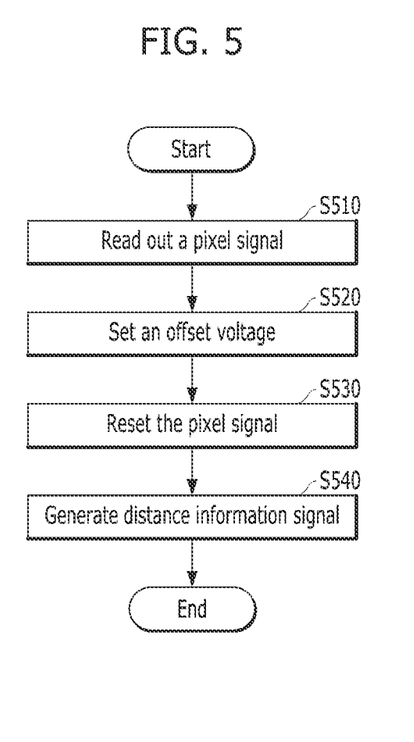
FIG. 5 is a flowchart describing an operation of an image sensing device in accordance with an embodiment of the present invention.

FIG. 5 is a flowchart describing an operation of an image sensing device in accordance with one embodiment of the present invention.

In step S510, the unit pixel of the pixel array 140 may read out the first and second pixel signals VPX_A and VPX_B in response to the selection signal SX. In a read-out section READOUT, the control signal generator 134 of the signal controller 130 may activate the selection signal SX to a logic high level. When the selection signal SX is activated, the first and second pixels TAPA and TATB may read-out the first and second pixel signals VPX_A and VPX_B corresponding to the first and second charges that are stored in the first and second charge storage circuits C1 and C2.

In step S520, the signal converter 150 may set an offset voltage between the read-out first and second pixel signals VPX_A and VPX_B and the ramp signal VRAMP. After the selection signal SX is activated to a logic high level in a read-out section READOUT, the control signal generator 134 may transition the switch signal SW between a logic low level and a logic high level. In response to the transition of the switch signal SW, the switching units SW1 and SW2 of the signal converter 150 may be turned on, and the offset voltage between the read-out first and second pixel signals VPX_A and VPX_B and the ramp signal VRAMP) may be stored in the first and second input units C3 and C4 of the signal converter 150.

In step S530, the unit pixel 142 of the pixel array 140 may reset the first and second pixel signals VPX_A and VPX_B in response to the transfer signal TX. After transitioning the switch signal SW, the control signal generator 134 may activate the transfer signal TX to a logic high level. When the transfer signal TX is activated, the first and second pixels TAPA and TATB may initialize the first and second charge storage circuits C1 and C2 and reset the first and second pixel signals VPX_A and VPX_B to initial values.

In step S540, the signal converter 150 may generate a distance information signal DOUT which corresponds to the difference between the voltage changes ΔVPX_A and ΔVPX_B of the first and second pixel signals VPX_A and VPX_B that are reset to the initial values in response to the ramp signal VRAMP. When the transfer signal TX is activated, the ramp signal generator 136 of the signal controller 130 may increase (e.g., gradually increase) the ramp signal VRAMP from a low voltage to a high voltage.

The signal converter 150 may generate a first count signal CNT1 corresponding to the voltage change ΔVPX_A by comparing the rising ramp signal VRAMP with the reset first pixel signal VPX_A. Also, the signal converter 150 may generate a second count signal CNT2 corresponding to the voltage change ΔVPX_B by comparing the rising ramp signal VRAMP with the reset second pixel signal VPX_B. The signal converter 150 may generate a distance information signal BOUT corresponding to the difference between the voltage changes ΔVPX_A and ΔVPX_B by processing the first count signal CNT1 and the second count signal CNT2.

According to one embodiment of the present invention, the image sensing device may set an offset voltage for analog-to-digital (A/D) conversion based on a read-out pixel signal and perform an analog-to-digital (A/D) conversion operation in a state that a pixel signal is reset. While the offset voltage is set and analog-to-digital conversion is performed, the transistor included in a unit pixel, that is, a driving transistor, may maintain the same state. Therefore, noise caused by a change in the threshold voltage of the transistor of the unit pixel, for example, fixed pattern noise, may be removed, and a signal-to-noise ratio of the distance information signal generated from the image sensing device may be improved.

While the present invention has been described with respect to the specific embodiments, it will be apparent to those skilled in the art that various changes and modifications may be made without departing from the spirit and scope of the invention as defined in the following claims.

What is claimed is:

1. An image sensing device, comprising:
   a pixel array including a unit pixel suitable to transfer and store charges in response to a transfer signal and read out at least one pixel signal corresponding to the stored charges in response to a selection signal provided to the unit pixel;
   a signal converter suitable for comparing the pixel signal with a ramp signal in response to a switch signal to generate a distance information signal, wherein the ramp signal has a voltage level which rises at a predetermined slope between a low voltage level and a high voltage level; and
   a signal controller suitable for generating control signals for controlling the pixel array and the signal converter, wherein the signal controller comprises
      a ramp signal generator suitable for generating the ramp signal and transferring the ramp signal to the signal converter, and
      a control signal generator suitable for generating a plurality of row signals for controlling the pixel array on a row basis and generating the switch signal for initializing the signal converter in a temporal read-out section where the pixel signal is read out,
   wherein the distance information signal is generated by comparing the voltage level of the rising ramp signal with respective voltages of first and second pixel signals,
   wherein the signal converter generates the distance information signal corresponding to a difference between voltage changes of the first and second pixel signals that are reset to respective initial values, in response to the ramp signal.

2. The image sensing device of claim 1, wherein the signal controller is suitable to generate the selection signal that is activated in the temporal read-out section, and
   when the selection signal is activated, the signal controller is suitable to transition the switch signal from a first logic level and to a second logic level.

3. The image sensing device of claim 2, wherein the signal converter includes:
   a first input circuit suitable for receiving the pixel signal to generate an input signal;
   a second input circuit suitable for receiving the ramp signal to generate a reference signal;
   a comparator suitable for comparing the input signal with the reference signal to output a comparison signal;
   a switching circuit suitable for selectively coupling an input node and an output node of the comparator in response to the switch signal; and
   a counter suitable for counting a clock signal in response to the comparison signal.

4. The image sensing device of claim 2, wherein the signal controller is suitable to generate the transfer signal, and wherein the transfer signal is activated when the switch signal transitions, and
   the unit pixel is suitable to reset the pixel signal in response to the activated transfer signal.

5. The image sensing device of claim 4, wherein the unit pixel includes:
   a charge storage circuit suitable for storing the charges;
   a reset circuit suitable for resetting the charge storage circuit in response to a reset signal;
   a transfer circuit suitable for transferring the charges to the charge storage circuit in response to the transfer signal; and
   a selection circuit suitable for generating the pixel signal corresponding to the charges stored in the charge storage circuit in response to the selection signal.

6. The image sensing device of claim 5, wherein the signal controller is suitable to generate the reset signal, and wherein the reset signal is activated simultaneously with the selection signal in the temporal read-out section.

7. The image sensing device of claim 6, wherein in response to the activated reset signal and the activated transfer signal, respectively, the reset circuit and the transfer circuit are suitable to initialize the charge storage circuit.

8. The image sensing device of claim 4, wherein the ramp signal gradually rises from a low voltage level to a high voltage level when the transfer signal is activated.

9. The image sensing device of claim 1, wherein the unit pixel includes:
- a first pixel suitable for generating first charges in response to an optical signal and a first phase signal and generating a first pixel signal corresponding to the first charges in response to the selection signal; and
- a second pixel suitable for generating second charges in response to the optical signal and a second phase signal and generating a second pixel signal corresponding to the second charges in response to the selection signal.

10. The image sensing device of claim 9, wherein the signal converter includes:
- a first signal converter suitable for generating a first count signal corresponding to a first voltage level difference between the first pixel signal and the ramp signal;
- a second comparator suitable for generating a second count signal corresponding to a second voltage level difference between the second pixel signal and the ramp signal; and
- a logic circuit suitable for processing the first count signal and the second count signal to produce count values and to output a difference between the count values as the distance information signal.

11. The image sensing device of claim 9, wherein the first and second phase signals have a phase difference of 180 degrees.

12. A method for operating an image sensing device, comprising:
- reading out, in response to a selection signal, a first pixel signal and a second pixel signal respectively corresponding to a first charges and a second charges that are stored in a unit pixel;
- setting an offset voltage between the read-out first and second pixel signals and generating a ramp signal in response to a switch signal, wherein the ramp signal has a voltage level which rises at a predetermined slope between a low voltage level and a high voltage level;
- resetting the first and second pixel signals in response to a transfer signal; and
- comparing the voltage level of the rising ramp signal with respective voltages of the reset first and second pixel signals and thereby generating a distance information signal corresponding to a voltage change difference between the reset first pixel signal and the reset second pixel signal that are reset to respective initial values, in response to the ramp signal.

13. The method of claim 12, wherein the selection signal is suitable to be activated in a temporal read-out section where the first and second pixel signals are read out, and
- when the selection signal is activated, the switch signal suitable to transition from a first logic level to a second logic level.

14. The method of claim 13, wherein when the switch signal transitions, the transfer signal is suitable to be activated.

15. The method of claim 14, wherein when the transfer signal is activated, the ramp signal is suitable to gradually rise from a low voltage to a high voltage.

16. The method of claim 12, wherein when the generating of the distance information signal includes:
- comparing the ramp signal with the reset first pixel signal to generate a first count signal corresponding to a first voltage change of the reset first pixel signal;
- comparing the ramp signal with the reset second pixel signal to generate a second count signal corresponding to a second voltage change of the reset second pixel signal; and
- processing the first count signal and the second count signal to generate the distance information signal.

* * * * *